United States Patent [19]
Vollmann

[11] Patent Number: 5,219,090
[45] Date of Patent: Jun. 15, 1993

[54] HOLDER PROVIDED WITH TWO COMPARTMENTS AND A COVER ARRANGEMENT

[75] Inventor: Norbert C. Vollmann, Eindhoven, Netherlands

[73] Assignee: U.S. Philips Corporation, New York, N.Y.

[21] Appl. No.: 844,263

[22] Filed: Mar. 2, 1992

[30] Foreign Application Priority Data

Mar. 4, 1991 [NL] Netherlands ............ 9100386

[51] Int. Cl.⁵ ............................................ B65D 1/24
[52] U.S. Cl. .................................. 220/525; 220/523; 220/524; 206/387; 206/444; 206/555
[58] Field of Search ............ 206/307, 309, 387, 444, 206/555; 312/10, 12; 220/523, 524, 525, 526, 529

[56] References Cited

U.S. PATENT DOCUMENTS

| | | | |
|---|---|---|---|
| 1,661,728 | 3/1928 | La Rue | 220/524 |
| 2,584,435 | 2/1952 | Doerr | 220/523 |
| 4,191,292 | 3/1980 | Schweizer | 206/387 |
| 4,412,616 | 11/1983 | Williams | 220/524 |
| 4,640,415 | 2/1987 | Ackeret | 206/387 |
| 4,664,261 | 5/1987 | Frodelius | 206/387 |
| 4,741,441 | 5/1988 | Keffeler | 220/524 |
| 4,807,749 | 2/1989 | Ackeret | 206/307 |
| 4,875,578 | 10/1989 | Nehl | 206/309 |
| 4,932,526 | 6/1990 | Nehl et al. | 206/387 |
| 4,976,350 | 12/1990 | Fukumoto | 206/387 |
| 5,004,106 | 4/1991 | Blumstock et al. | 220/525 |
| 5,076,437 | 12/1991 | Schindler | 220/523 |

*Primary Examiner*—David T. Fidei
*Attorney, Agent, or Firm*—Norman N. Spain

[57] ABSTRACT

A holder has two main walls, a plurality of transverse walls, and an internal partition extending parallel to the two main walls to divide the holder into two compartments. At one side the holder has a first opening, which gives access to the first compartment, and a second opening, which gives access to the second compartment. The holder further comprises a cover arrangement with a first cover, which in the closed position closes the first opening, and a second cover, which in a closed position closes the second opening and extends both over the first opening and the second opening. The first cover is connected to the partition via a first hinge and the second cover is connected to the first cover via a second hinge.

7 Claims, 4 Drawing Sheets

HOLDER PROVIDED WITH TWO COMPARTMENTS AND A COVER ARRANGEMENT

BACKGROUND OF THE INVENTION

The invention relates to a holder having two main walls and a plurality of transverse walls, which holder comprises a cover arrangement and an internal partition extending parallel to the two main walls to divide the holder into two compartments.

A holder of the type defined in the opening paragraph is known from Philips Technical Review 40, November 1982, page 180. The holder shown therein has a first compartment for holding a printed sheet of paper visible from the back of the holder and a second compartment for holding a Compact Disk. A partition with holding means for the CD is situated between the two compartments. The second compartment can be closed by means of a cover connected to the holder by means of two pivots. Thus, the holder comprises three parts, i.e. a housing section, a partition and a cover. The first compartment is closed by the partition, which snaps into the holder. This holder also contains an additional enclosure. This enclosure is situated in the second compartment and is held against the cover by means of lugs. The additional enclosure often takes the form of a booklet and provides further data about the information recorded on the CD. To read this data the booklet generally has to be removed from the holder. A drawback of this construction is that the lugs impede an easy removal of the enclosure from the holder. When the booklet or the CD is removed it happens quite often that the booklet is damaged. A more suitable place for the booklet would be the first compartment, but this compartment is not readily accessible because it is closed by the partition. Another drawback of this prior-art holder is that the partition has to be removed before the enclosure can be inserted into the first compartment.

OBJECTS AND SUMMARY OF THE INVENTION

It is one of the objects of the invention to provide a two-compartment holder whose compartments are both readily accessible and can be closed by means of a cover arrangement which is simple to operate.

To this end the holder in accordance with the invention is characterised in that at one side the holder has a first opening, which gives access to the first compartment, and a second opening, which gives access to the second compartment, and the cover arrangement comprises a first cover having a first main portion, which in the closed position closes the first opening, and a second cover having a second main portion, which in a closed position closes the second opening and extends both over the first opening and the second opening, the first cover having an edge connected to the partition via a first hinge and the second cover having an edge connected to a further edge of the first cover via a second hinge, which further edge is situated opposite the first hinge. Since the second hinge is situated at a distance from the second opening the second cover, when in an open position, is also situated at a distance from the opening, so that the access to the opening is totally free and cannot be obstructed or restricted by a cover in an open position. This cover arrangement also provides ready access to the first compartment when the first cover is opened. After the second cover has been opened, which causes the second cover to be pivoted about the second hinge, the first cover can be opened simply by pulling the second cover.

An embodiment of the holder in accordance with the invention is characterised in that the partition and the cover arrangement form a single inner section, the hinges being integral hinges. This construction leads to a two-part holder whose two parts can be manufactured simply by, for example, injection-moulding. As a result, this holder can be manufactured more simply and cheaply than the prior-art holder comprising three parts.

A further embodiment of the holder in accordance with the invention is characterised in that the inner section can be slid into and out of a housing section formed by the main walls and the transverse walls of the holder and is snapped in the housing section in the slid-in position. This construction enables the holder to be assembled simply and rapidly, thereby saving time and cost in the production of the holders.

Yet another embodiment of the holder in accordance with the invention is characterised in that the partition comprises a plurality of transverse members secured to the partition and extending from the partition up to the main walls of the housing section. As a result of these transverse members the partition interlocks in the housing section, so that the housing section does not require any additional provisions such as guide slots or ridges for guiding the partition during insertion of the partition and for keeping the partition in position in the assembled condition.

Still another embodiment of the holder in accordance with the invention is characterised in that at least one of the two covers comprises flanges extending transversely of the main portion and secured to two further mutually opposite edges of the main portion, and said cover is latched in the closed position by means of latching elements, which latching elements comprise two interengageable latching elements, one on or in one of the flanges of the cover and another on or in the transverse member facing the flange in the closed position of the cover. As a result of this, the inner surfaces of the walls of the housing section need not be formed with latching elements, which simplifies the manufacture of the housing section. Projections on or recesses in the inner surfaces of the walls of the housing section are undesirable because such a construction gives rise to problems in removing the injection-moulded housing section from the mould.

BRIEF DESCRIPTION OF THE DRAWINGS

The invention will now be described in more detail, by way of example, on the basis of an embodiment of the holder in accordance with the invention shown in the FIGS. In the FIGS..

DESCRIPTION OF THE PREFERRED EMBODIMENT

Figure 1:
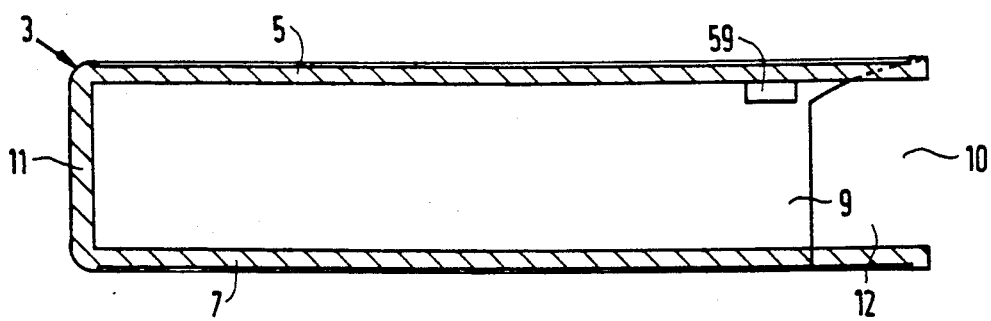
FIG. 1 is a longitudinal sectional view of a housing section of the holder in accordance with the invention.
Figure 2:
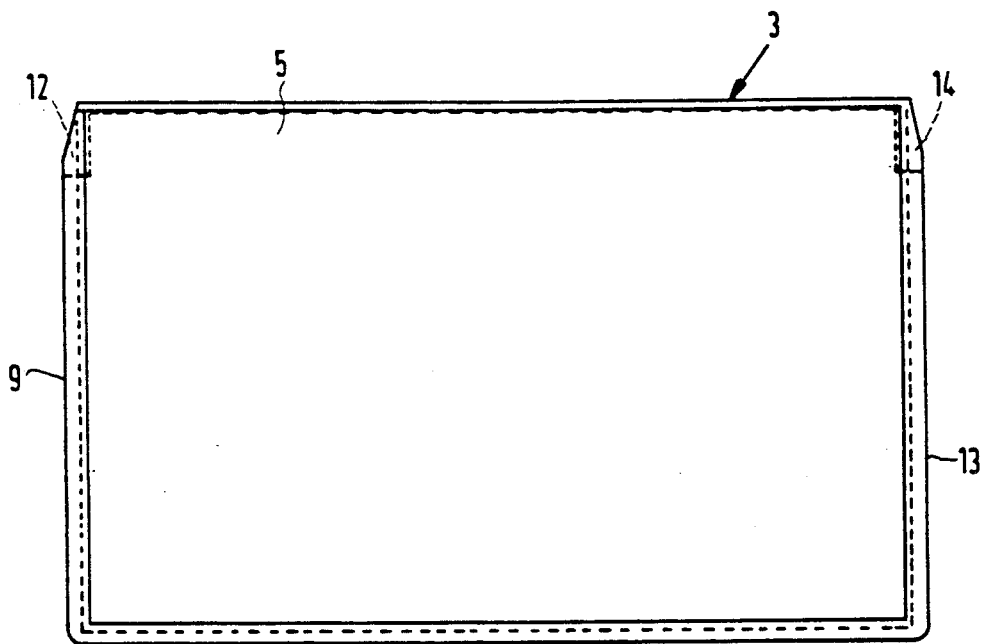
FIG. 2 is a plan view of the housing section.
Figure 3:
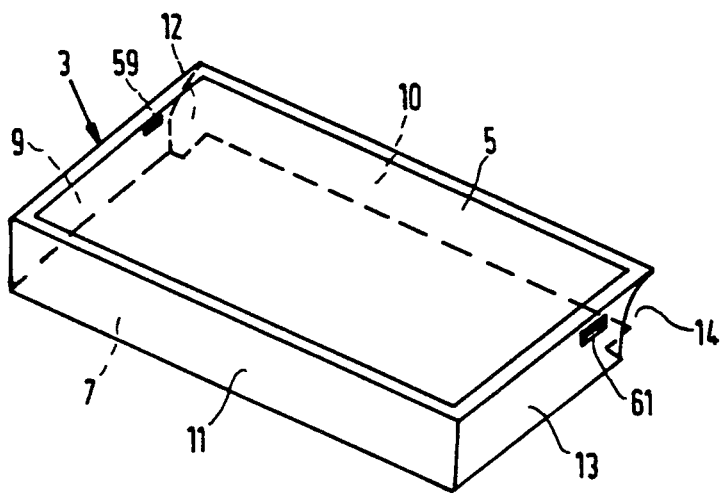
FIG. 3 is a perspective view of the housing section.

FIGS. 1-9C show an exemplary embodiment of a holder 1 in accordance with the invention. The holder comprises a housing section 3 (see FIGS. 1-3) provided with an inner section 15 (see FIGS. 4-6). FIGS. 1, 2 and 3 show the housing section in a longitudinal sectional view, a plan view and a perspective view respectively. The housing section 3 comprises two main walls 5, 7 interconnected by transverse walls 9, 11, 13. At a side 10 the housing section is open for insertion of the inner section 15. Near this open side 10 the transverse walls 9 and 13 have two openings 12 and 14 for receiving flanges 71, 73 of a cover arrangement 31 (see FIG. 4), which forms part of the inner section 15. The transverse walls 9 and 13 further have two rectangular holes 59 and 61 for receiving projections 55 and 57 (see FIG. 5) provided on the inner section 15, enabling the inner section 15 to be snapped into the housing section 3.

Figure 4:
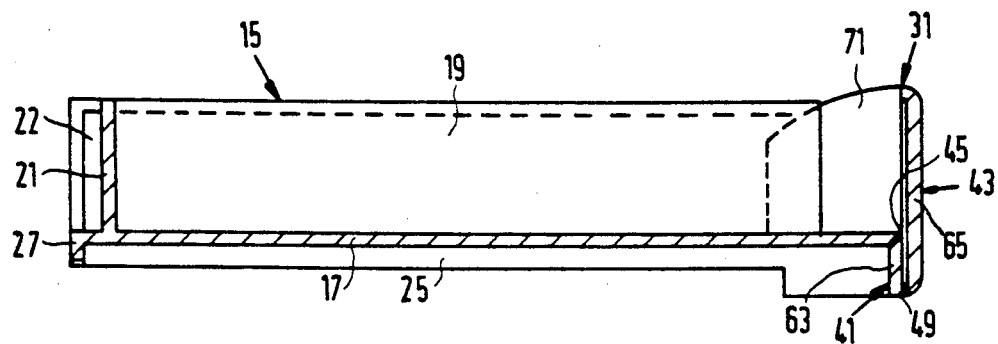
FIG. 4 is a longitudinal sectional view of an inner section of the holder in accordance with the invention.
Figure 5:
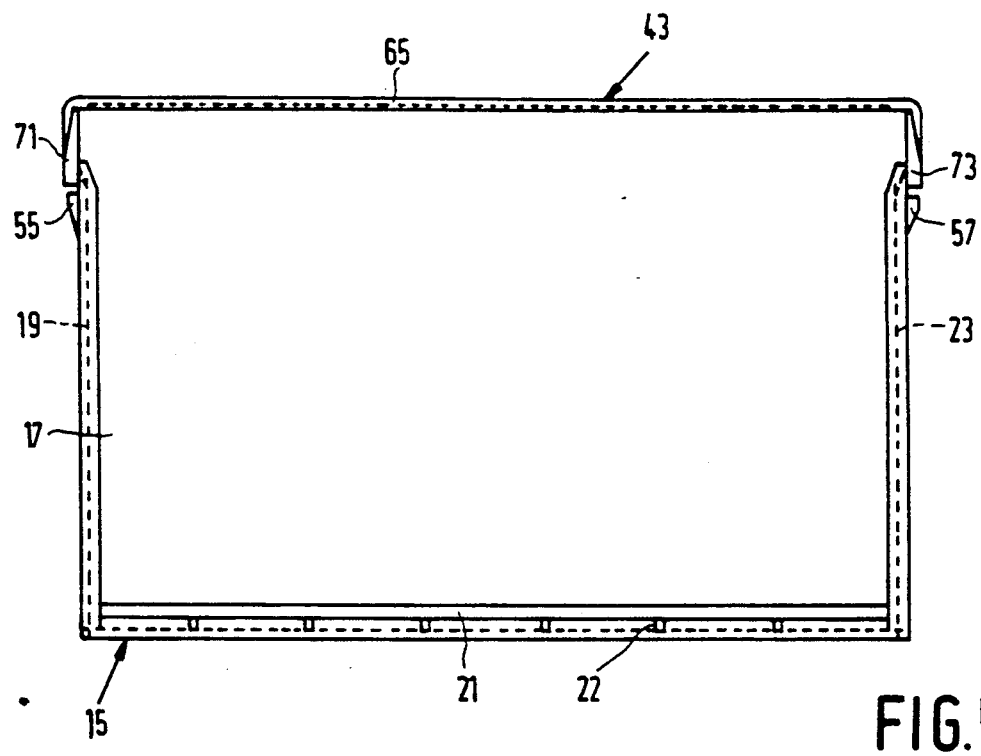
FIG. 5 is a plan view of the inner section.
Figure 6:
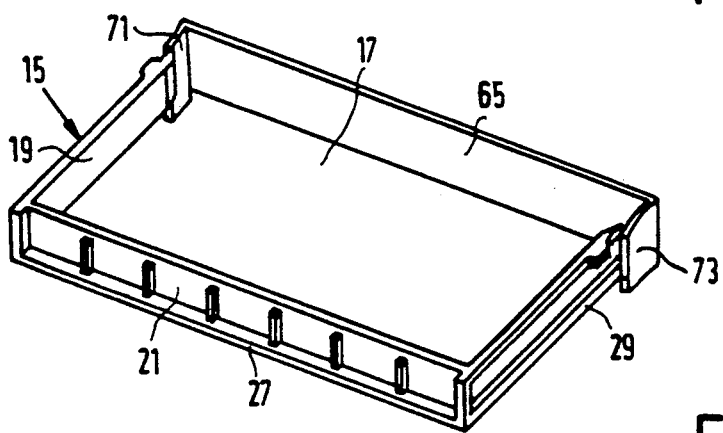
FIG. 6 is a perspective view of the inner section.

FIGS. 4, 5 and 6 show the inner section 15 in a longitudinal sectional view, a plan view and a perspective view respectively. The inner section 15 comprises a partition 17, transverse members 19, 21, 23, 25, 27, 29 and a cover arrangement 31. The transverse member 21 is reinforced by the provision of ribs 22. The hinge system 31 comprises a first cover 41, which has an edge connected to the partition via a first integral hinge 45, and a second cover 43, which has an edge connected to a further edge of the first cover via a second integral hinge 49. The covers 41 and 43 each comprise a main portion 63 and 65 respectively and the second cover 43 further comprises flanges 71 and 73, which are situated at the location of the openings 12 and 14 in the transverse walls 9 and 13 in the closed position of this cover. The transverse members 19 and 23 carry the projections 55 and 57 for snapping the inner section 15 into the housing section 3.

Figure 7:
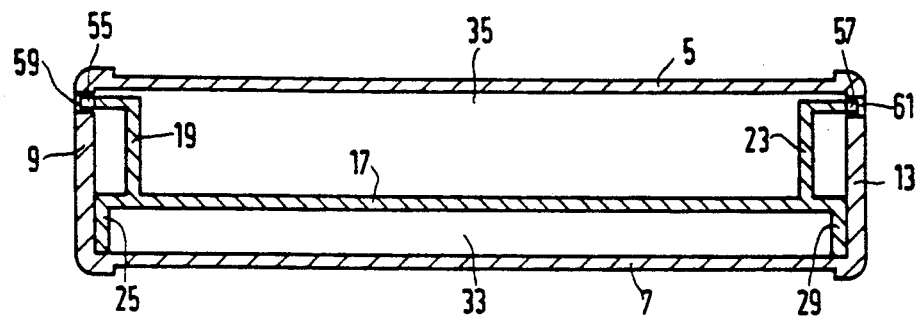
FIG. 7 is a cross-sectional view of the housing section shown in FIGS. 1–3 provided with the inner section shown in FIGS. 4–6.
Figure 8:
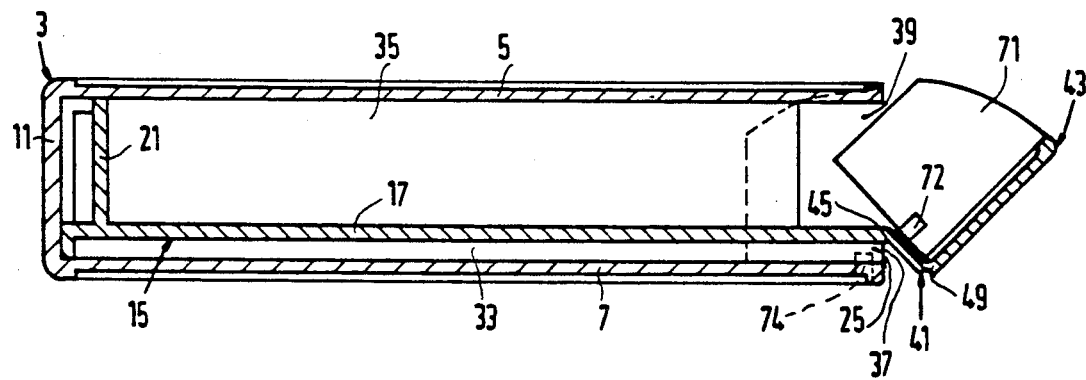
FIG. 8 is a longitudinal sectional view of the housing section shown in FIGS. 1-3 provided with the inner section shown in FIGS. 4-6.

FIGS. 7 and 8 are sectional views showing the housing section 3 provided with the inner section 15. The partition 17 divides the space inside the housing section 3 into two compartments 33 and 35. At the open side the housing section 3 has two openings 37, 39, of which a first opening 37 gives access to the first compartment 33 and a second opening 39 gives access to the second compartment 35. The first cover 41 can close the entrance to the first compartment 33 and the second cover 43 can close the entrance to the second compartment 35. Closing the second cover is possible only if the first cover 41 is closed, thereby enabling the second hinge 49 to act as a pivot for the second cover 43. In the closed position the second cover 43 extends across the whole side 10. The second compartment 35 has the size and shape of a Digital Compact Cassette. Therefore, the holder is very suitable for holding such a cassette. The first compartment 33 can accommodate an enclosure, for example an information booklet. The main walls 5 and 7 of the housing section 3 are preferably made of a transparent material, so that the content is clearly visible. The inner surface of the flange 71 carries a further projection 72, which engages a recess 74 in the transverse member 25 when the second cover 43 is in its closed position. The recess 74 and the further projection 72 constitute latching means for latching the cover 43 in its closed position. The transverse members 19, 21, 23, 25, 27, 29 extend from the partition 17 up to the main walls 5, 7 of the housing section 3, so that the inner section interlocks with the housing section 3.

Figure 9A:
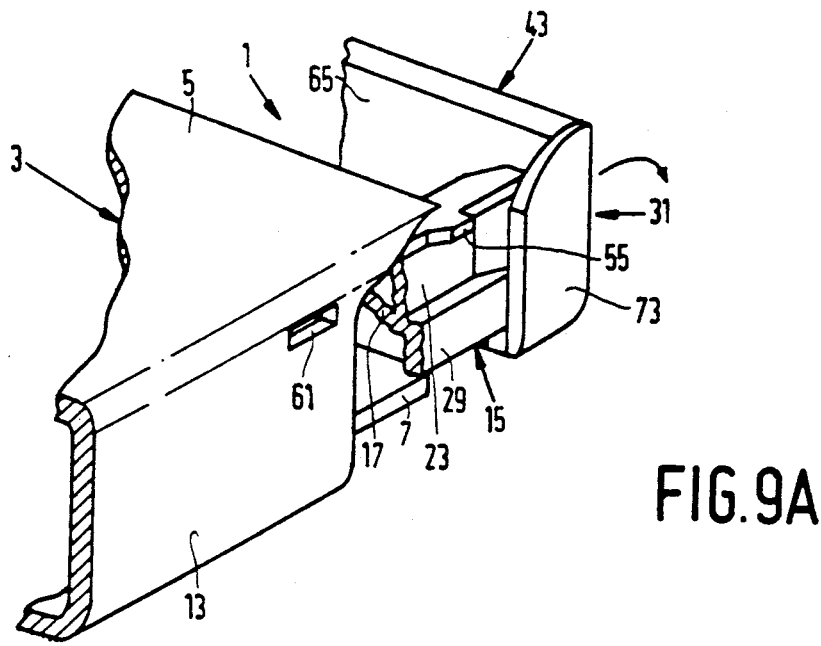
FIG. 9A is a perspective view of a part of the holder with the inner section partly slid out of the housing section.
Figure 9B:
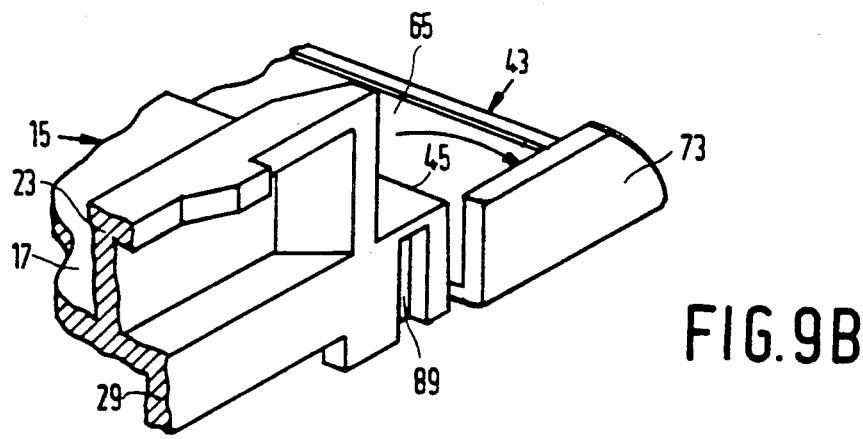
FIG. 9B is a perspective view of a part of the inner section with a second cover shown in the open position.
Figure 9C:
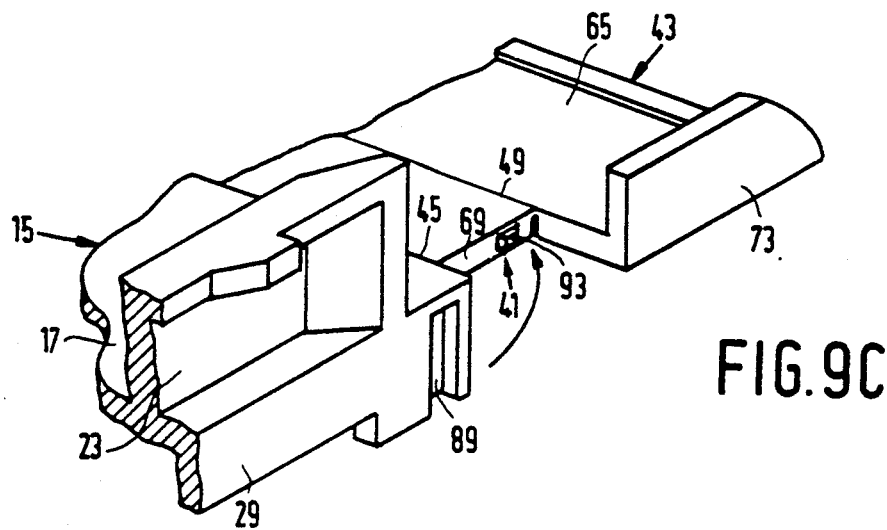
FIG. 9C illustrates the inner section shown in FIG. 9B with both a first cover and a second cover in the open position.

FIGS. 9A, 9B and 9C illustrate the hinging movements of the covers 41 and 43 during opening. For the sake of clarity FIG. 9A shows the inner section 15 partly slid out of the housing section 3 and FIGS. 9B and 9C show only a part of the inner section. FIG. 9A shows the cover arrangement 31 in the closed position. The first cover 41 is latched by means of a latching element 93 (see FIG. 9C) in the form of a projection which snaps into a recess (not shown) formed in the inner surface of the transverse member 29. The second cover 43 is latched by means of a latching element 89 (see FIG. 9C) in the form of a recess in the transverse member 29, which recess is engaged by a further projection (not shown) provided on the inner surface of the flange 73. With this construction all the latching elements are situated on or in the inner section 15, so that the latching system can be manufactured accurately and is not dependent on dimensional tolerances between the housing section 3 and the inner section 15. The inner section 15 can be slid into the housing section 3 and can be latched by means of the projection 55 and the hole 61. When the second cover 43 is opened it pivots about the hinge 49 (see FIG. 9C) which is situated at the lower edge of the first cover. FIG. 9B shows the inner section 15 with the second cover 43 in the open position. The second compartment is now accessible, thus enabling for example a cassette to be removed from the holder. Only now can the first cover 41 be opened. FIG. 9C shows the inner section 15 with the two covers 41 and 43 in the open position. During opening the first cover 41 pivots about the hinge 45.

I claim:

1. A holder having two main walls and a plurality of transverse walls, which holder comprises a cover arrangement and an internal partition extending parallel to the two main walls to divide the holder into two compartments, characterised in that at one side the holder has a first opening, which gives access to the first compartment, and a second opening, which gives access to the second compartment, and the cover arrangement comprises a first cover having a first main portion, which in the closed position closes the first opening, and a second cover having a second main portion, which in a closed position closes the second opening and extends both over the first opening and the second opening, the first cover having an edge connected to the partition by a first hinge and the second cover having an edge connected to a further edge of the first cover by a second hinge, which further edge is situated opposite the first hinge.

2. A holder as claimed in claim 1, characterized in that the partition and the cover arrangement together with the traverse walls form a single inner section and the hinges are integral.

3. A holder as claimed in claim 2, characterised in that the inner section can be slid into and out of a housing section formed by the main walls and the transverse walls of the holder and is snapped in the housing section in the slid-in position.

4. A holder as claimed in claim 1, characterised in that the partition comprises a plurality of transverse members secured to the partition and extending from the partition up to the main walls of the housing section.

5. A holder as claimed in claim 2, characterized in that the partition comprises a plurality of transverse members secured to the partition and extending from the partition up to the main walls of the housing section.

6. A holder as claimed in claim 3, characterized in that the partition comprises a plurality of transverse members secured to the partition and extending from the partition up to the main walls of the housing section.

7. A holder as claimed in claim 4, characterized in that at least one cover of said first cover and said second cover comprises flanges extending transversely of the main portion of said at least one cover and secured to mutually opposite edges of said main portion, and said at least one cover is latched in a closed position by means of two latching elements comprising two interengeable latching elements, one of said interengeable latching elements being on one of said flanges and the other of said latching elements being on a transverse number facing said flange when said at least one cover is in the closed position.

* * * * *